US007554281B2

United States Patent
Satake et al.

(10) Patent No.: US 7,554,281 B2
(45) Date of Patent: Jun. 30, 2009

(54) SYNCHRONOUS MACHINE CONTROL APPARATUS

(75) Inventors: Akira Satake, Tokyo (JP); Atsuo Haishi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 270 days.

(21) Appl. No.: 11/596,300

(22) PCT Filed: Apr. 27, 2005

(86) PCT No.: PCT/JP2005/008013

§ 371 (c)(1),
(2), (4) Date: Nov. 13, 2006

(87) PCT Pub. No.: WO2005/112249

PCT Pub. Date: Nov. 24, 2005

(65) Prior Publication Data

US 2008/0191656 A1    Aug. 14, 2008

(30) Foreign Application Priority Data

May 14, 2004  (JP) .............................. 2004-144360

(51) Int. Cl.
  *H02P 7/00*  (2006.01)
(52) U.S. Cl. .................. 318/432; 318/434; 318/714; 318/400.15
(58) Field of Classification Search ................. 318/432, 318/434, 714, 400.15
See application file for complete search history.

(56) References Cited

U.S. PATENT DOCUMENTS

| 4,677,360 A | * | 6/1987 | Garces | ................. | 318/803 |
| 4,814,677 A | * | 3/1989 | Plunkett | ................. | 318/400.02 |
| 5,362,222 A | * | 11/1994 | Faig et al. | ................. | 425/145 |
| 2002/0097015 A1 | * | 7/2002 | Kitajima et al. | ............. | 318/432 |
| 2003/0173921 A1 | * | 9/2003 | Nakazawa | ................. | 318/432 |

FOREIGN PATENT DOCUMENTS

| JP | 07 135800 | 5/1995 |
| JP | 09 74800 | 3/1997 |
| JP | 10 243679 | 9/1998 |
| JP | 10 243699 | 9/1998 |
| JP | 2000 341991 | 12/2000 |
| JP | 2003 284399 | 10/2003 |

* cited by examiner

*Primary Examiner*—Lincoln Donovan
*Assistant Examiner*—Renata McCloud
(74) *Attorney, Agent, or Firm*—Oblon, Spivak, McClelland, Maier & Neustadt, P.C.

(57) ABSTRACT

A synchronous machine control apparatus which can produce a torque level as close as possible to a desired torque command level while considering limitations on an output current of a power conversion unit. A synchronous machine control apparatus includes a torque current command generator including a torque current calculator for calculating a torque current command $i\delta^{**}$ from a torque command $\tau^*$ and a flux command $\phi^*$, a torque current limit generator for generating a maximum torque current command value $i\delta^*$ max that can be generated based on a magnetizing current command $i\gamma^*$ and a current limit value imax, and a limiter for imposing limitations on $i\delta^{**}$ based on $i\delta^*$ max, a flux command generator for calculating the flux command $\phi^*$ based on $i\delta^*$ fed from the torque current command generator, a flux calculator for calculating an interlinked armature flux feedback value $|\Phi|$ based on an armature current feedback value, and a flux controller for generating the magnetizing current command $i\gamma^*$ such that $\phi^*$ and $|\Phi|$ coincide with each other and delivering $i\gamma^*$ to the torque current command generator.

11 Claims, 13 Drawing Sheets

SYNCHRONOUS MACHINE CONTROL APPARATUS

TECHNICAL FIELD

The present invention relates to a control apparatus for a synchronous machine, such as a permanent magnet motor or a reluctance motor.

BACKGROUND ART

Conventionally, a synchronous machine, such as a permanent magnet motor or a reluctance motor, is controlled such that an armature current vector is oriented in a fixed phase direction with respect to a rotor. For example, a conventional permanent magnet motor is controlled such that an armature current vector is oriented in a direction perpendicular to an axis of magnetic flux produced by each permanent magnet of a rotor and the magnitude of the armature current vector becomes proportional to a desired torque.

On the other hand, while synchronous machines which utilize reluctance torque produced by saliency of the rotor are increasingly used in recent years, it is known that the magnitude of the armature current vector is not proportional to a torque produced by these motors and, thus, it is difficult to control the motor torque with high precision by conventional control methods. Also, when the turning speed of a permanent magnet motor increases, an armature voltage increases due to a voltage induced by magnetic flux produced by permanent magnets and eventually exceeds a voltage that a control apparatus can output. To prevent this inconvenience, the permanent magnet motor is operated by field-weakening control in which an armature current vector having a negative current value (or field-weakening current) is produced in a direction of an axis of the magnetic flux produced by each permanent magnet for reducing interlinked armature flux. Even when the field-weakening current is kept unchanged, however, the armature voltage varies with changes in output torque. It has therefore been difficult to control the armature voltage to match a desired value under conditions of varying output torque by the conventional control methods.

A technique described in patent document 1 is a known example of means for solving the aforementioned problem. The technique disclosed in patent document 1 is such that an interlinked armature flux command and an armature current (torque current) command perpendicular thereto are generated so that a synchronous machine produces a desired torque and armature voltage, a current (magnetizing current) command oriented in a magnetic flux axis direction is determined so that the interlinked armature flux obtained by calculating magnetic flux from the armature current coincides with the aforementioned flux command and, then, current commands oriented in d- and q-axis directions of a rotor are generated from the torque current command and the magnetizing current command.

Patent document 1: Japanese Patent Application Publication No. 10-243699 (paragraphs 0038-0040, FIG. 1, FIG. 3)

DISCLOSURE OF THE INVENTION

Problems to be Solved by the Invention

A conventional synchronous machine control apparatus calculates a flux command from a torque command and turning speed. An upper limit of the flux command is determined by a value obtained by dividing a maximum output voltage of a power conversion unit. In a case where a voltage across motor terminals does not reach the maximum output voltage of the power conversion unit, however, it is necessary to give an optimum flux command which would maximize desired motor performance with respect to the torque command, where the desired motor performance is expressed in terms of the ratio of torque to armature current or the ratio of torque to power consumption. The conventional synchronous machine control apparatus calculates a torque current command and a magnetizing current command from the aforementioned torque command and flux command.

There is a maximum output current that the power conversion unit can output and, thus, a combination of currents produced by the torque current command and the magnetizing current command must be limited not to exceed the maximum output current that the power conversion unit. Since the conventional synchronous machine control apparatus determines the flux command from the torque command and the turning speed, there has been a problem that the aforementioned optimum flux command can not be obtained in consideration of this current limitation.

The present invention has been made to solve the aforementioned problems. Specifically, it is an object of this invention to provide a synchronous machine control apparatus which can produce a torque of which level is as close as possible to a desired torque command level while taking into consideration limitations on an output current of a power conversion unit.

Means for Solving the Problems

A synchronous machine control apparatus according to the invention generates an armature current command from a torque command and controls an armature current of a synchronous machine by means of a power conversion unit based on the armature current command. The synchronous machine control apparatus includes a torque current command generator including a torque current calculator for calculating a torque current command which is a torque component of the armature current command from the torque command and a flux command, a torque current limit generator for generating a maximum torque current command value which can be generated based on a magnetizing current command which is a magnetizing component of the armature current command and a current limit value of the power conversion unit such that the armature current does not exceed the aforementioned current limit value, and a limiter for imposing limitations on the torque current command based on the maximum torque current command value, a flux command generator for calculating the flux command based on the torque current command fed from the torque current command generator, a flux calculator for calculating interlinked armature flux based on the armature current or on a combination of the armature current and an armature voltage of the synchronous machine, and a flux controller for generating the magnetizing current command such that the flux command and the aforementioned interlinked armature flux coincide with each other and delivering the magnetizing current command to the torque current command generator.

Advantageous Effects of the Invention

According to this invention, the torque current command is calculated with reference to the flux command and the magnetizing current command, so that it is possible to take into consideration limitations on an output current of the power conversion unit. Also, since the flux command is calculated with reference to the torque current command, it is possible to optimize the flux command such that the flux command reflects changes in the torque current command due to the aforementioned limitations on the output current.

BEST MODES FOR CARRYING OUT THE INVENTION

First Embodiment

FIG. 1 is a configuration diagram showing a synchronous machine control apparatus according to a first embodiment of the present invention. A synchronous machine 1 is driven with armature windings thereof connected to a three-phase drive circuit 2 which works as a power conversion unit. A current flowing through each armature winding is detected by a current sensor 3. Also, rotor phase (electrical angle) θ of the synchronous machine 1 is detected by a rotor position sensor 4.

As will be later discussed with reference to FIGS. 6 and 7, a flux calculator 5 calculates the magnitude |Φ| and phase ∠Φ of interlinked armature flux from three-phase armature current feedback values iu, iv, iw and three-phase voltage commands vu*, vv*, vw* (which are written in simplified forms as vu, vv, vw in the Figure), for example.

Since armature currents are controlled on two axes, that is, the direction (γ-axis) of the phase ∠Φ of the interlinked armature flux and a direction (δ-axis) perpendicular thereto, a coordinate converter 7 converts the armature current feedback values iu, iv, iw into currents iγ⁻ and iδ⁻ on the γ- and δ-axes, respectively, where the γ-axis current corresponds to a magnetizing current which is a magnetizing component of the armature currents and the δ-axis current corresponds to a torque current which is a torque component of the armature currents.

An armature current controller 6 performs current control processing operation such that the armature currents iγ⁻, iδ⁻ on the γ- and δ-axes coincide with specified armature current commands iγ*, iδ* for the γ- and δ-axes and then outputs voltage commands vγ, vδ for the γ- and δ-axes, respectively. These voltage commands vγ, vδ are converted by a coordinate converter 8 into the three-phase voltage commands vu*, vv*, vw*, which are output to the three-phase drive circuit 2.

On the other hand, a torque current command generator 9 calculates the γ-axis current (magnetizing current) command iγ* from a given torque command τ* as well as the δ-axis current (torque current) command iδ* referring to a flux command Φ*.

A flux command generator 10 calculates the flux command Φ* from the δ-axis current command iδ* referring to a turning speed ω obtained by differentiating the rotor phase θ by a differentiator 11. An adder 12 calculates a magnetic flux error by subtracting the magnitude |Φ| of the interlinked armature flux output from the flux calculator 5 from the flux command Φ*, and a flux controller 13 adjusts the γ-axis current command iγ* such that the magnetic flux error becomes zero.

FIG. 2 shows an internal configuration of the torque current command generator 9. Since the interlinked armature flux is controlled to be oriented in the same direction as the γ-axis in a control system shown in FIG. 1, there is a relationship expressed by equation (1) between a torque τ produced by the synchronous machine 1 and a δ-axis current iδ, where pp is the number of pairs of poles of the synchronous machine 1.

$$i_\delta = \frac{\tau}{pp \cdot |\Phi|} \quad (1)$$

If magnetic flux is controlled in a successful fashion, the magnitude |Φ| of the magnetic flux and the flux command Φ* coincide with each other. Thus, a torque current calculator 15 calculates an intermediate δ-axis current command value iδ** from an equation obtained by substituting the flux command Φ* for |Φ| in equation (1). A torque current limit generator 14 calculates a maximum δ-axis current command value iδ*max according to equation (2) by using the γ-axis current command iγ* and a current limit value imax.

$$i_\delta^* max = \sqrt{(i_{max})^2 - (i_\gamma^*)^2} \quad (2)$$

A limiter 16 outputs the δ-axis current command iδ* while limiting the intermediate δ-axis current command value iδ** to the maximum δ-axis current command value iδ*max.

FIG. 3 shows an internal configuration of the flux command generator 10. An optimum flux command calculator 17 outputs a flux command optimum for the input δ-axis current command iδ*. A conceptual explanation of this working of the optimum flux command calculator 17 is given below with reference to FIGS. 4 and 5.

If phase ρ of a current vector having a fixed magnitude is varied from a d-axis of a rotor as shown in FIG. 4 in permanent magnet motors (including those which utilize reluctance torque, such as interior permanent magnet, or IPM, motors) or reluctance motors, there is found a phase at which torque is maximized as shown in FIG. 4(b).

In a rotor of a permanent magnet motor, an axis of magnetic flux produced by a permanent magnet corresponds to the d-axis and an axis perpendicular to the axis of the magnetic flux produced by the permanent magnet corresponds to a q-axis.

In a motor having inverse saliency like an IPM motor, for example, in which q-axis inductance is larger than d-axis inductance, the torque is maximized at a specific phase angle of a current vector larger than 90° as shown in FIG. 4. If a core is not magnetically saturated, such an optimum current phase ρ remains at a fixed point regardless of the magnitude of the armature current. In an actual motor, however, the inductance varies due to magnetic saturation and, therefore, the optimum current phase ρ varies with the magnitude of the armature current due to the influence of reluctance torque.

In an ordinary IPM motor, for example, there occurs no magnetic saturation under conditions where the armature current is small, so that the torque increases when the phase ρ is made larger than 90° (e.g., approximately 110°) under these conditions. When the armature current increases, however, the magnetic saturation occurs chiefly in the q-axis direction in which the current flows and, as a consequence, a difference between the q-axis inductance and the d-axis inductance decreases. Thus, the torque increases when the phase ρ is made smaller (e.g., approximately 100°) under these conditions.

Now, a relationship between the armature current and magnetic flux is examined. FIG. 5 is a vector diagram of the motor in a maximum torque state shown in FIG. 4(b), in which interlinked armature flux Φ is expressed by a composition of armature reaction flux Φa caused by a current vector i and permanent magnet flux Φm. If a direction perpendicular to the interlinked armature flux Φ is the δ-axis, a component of the current vector i taken along the δ-axis direction is the δ-axis current.

Therefore, if the current vector i is defined by the magnitude of the armature current and the optimum current phase ρ determined by this magnitude, the δ-axis current iδ and the magnitude of the interlinked armature flux Φ are uniquely determined. From this, it is understood that there is a relationship expressed by one-to-one correspondence between the δ-axis current iδ and the magnitude |Φ| of the magnetic flux under maximum torque conditions. It is to be noted that the magnitude |Φ| of the magnetic flux is determined without any consideration of voltage limitations.

Returning to FIG. 3, the optimum flux command calculator 17 stores the aforementioned relationship between the δ-axis current iδ and the magnitude |Φ| of the magnetic flux in the form of an equation or a data table and outputs an optimum flux command Φ** which is the magnitude of optimum magnetic flux in accordance with the input δ-axis current command iδ*. While the δ-axis current command iδ* and the optimum flux command Φ are so correlated as to maximize an output torque in the above explanation, the optimum flux command Φ may aim at maximum efficiency, for instance, depending on the purpose of operation. Generally, it is possible to obtain operational characteristics suited to the purpose of operation if the δ-axis current command iδ* and the optimum flux command Φ** are correlated such that desired performance is maximized.

In a case where the δ-axis current command iδ* and the optimum flux command Φ are to be correlated such that maximum efficiency would be achieved, for example, it would be possible to further improve the characteristics if an adjustment for decreasing the optimum flux command Φ with an increase in motor speed is made referring to the motor speed as a factor for taking into consideration the influence of core loss.

A flux limit generator 18 calculates a maximum flux command value Φ*max (vertical axis of a characteristic curve in a block of the flux limit generator 18) suited to the motor speed ω (vertical axis of the same characteristic curve) based on a voltage that the power conversion unit (three-phase drive circuit) can output. A limiter 19 outputs the flux command Φ* while limiting the optimum flux command Φ** output from the optimum flux command calculator 17 to the maximum flux command value Φ*max.

The configuration of FIG. 1 has a problem that calculation between the torque current command generator 9 and the flux command generator 10 becomes cyclical. Specifically, if the configuration of FIG. 1 is used as it is for performing signal processing, there is formed a loop involving the torque command τ*, the torque current command generator 9, the torque current command iδ*, the flux command generator 10, the flux command Φ*, the torque current command generator 9, the torque current command iδ*, and so on in this order. In order to determine the torque current command iδ* and the flux command Φ* from the input torque command τ*, it is necessary for the torque current command generator 9 and the flux command generator 10 to repeatedly perform calculations until calculation results converge, and this generally requires a long processing time. Depending on conditions, there may arise a problem that the calculation results do not converge.

If a slight deterioration of calculating accuracy is allowed for, however, it is possible to avoid the aforementioned problem by taking measures described below, for example. One method usable in performing the aforementioned calculation process at specific processing intervals by using a microprocessor in an actual apparatus would be such that a calculation result obtained in a preceding calculation cycle is adopted as the flux command Φ* to be used by the torque current command generator 9 and the flux command generator 10 calculates the flux command Φ* in a current calculation cycle from the δ-axis current command iδ* calculated by using the preceding command value, for example. Also, it is possible to increase stability of the calculation process if the flux command generator 10 outputs the value of the flux command Φ* through a proper filter.

While the flux command Φ* and the γ-axis current command iγ* are used in the calculation performed by the torque current command generator 9 as discussed with reference to FIGS. 1 to 3, the magnitude |Φ| of the magnetic flux and a γ-axis current feedback value iγ⁻ which are actual values may be used instead. Also, while the δ-axis current command iδ* is used in the calculation performed by the flux command generator 10, a δ-axis current feedback value iδ⁻ which is an actual value may be used instead. Although the calculations for control operation become more susceptible to the influence of noise contained in the actual values as a result of these variations, this approach makes it possible to avoid the aforementioned problem that the calculation becomes cyclical.

Next, FIG. 6 shows an example of an internal configuration of the flux calculator 5. Referring to FIG. 6, a coordinate converter 20 converts the three-phase armature currents iu, iv, iw into d- and q-coordinate currents id, iq on the rotor axes by using the rotor phase θ. A current-type flux calculator 21 calculates the magnitude |Φ| of the interlinked armature flux Φ and phase Δθ of the interlinked armature flux Φ with respect to the d-axis from the d- and q-axis currents id, iq.

In a permanent magnet motor, there is a relationship expressed by equations (3) between currents and magnetic fluxes.

$$\begin{cases} \phi_d = L_d i_d + \phi_m \\ \phi_q = L_q i_q \end{cases} \quad (3)$$

where φd is d-axis flux, φq is q-axis flux, Ld is d-axis inductance, Lq is q-axis inductance and φm is permanent magnet flux. In a reluctance motor, φm in equations (3) becomes zero (φm=0). Using the d- and q-axis fluxes φd, φq, the magnitude |Φ| of the interlinked armature flux and the phase Δθ of the interlinked armature flux with respect to the d-axis are obtained from equations (4).

$$|\Phi| = \sqrt{\phi_d^2 + \phi_q^2}, \quad (4)$$

$$\Delta\theta = \tan^{-1} \frac{\phi_q}{\phi_d}$$

An adder 22 calculates the phase ∠Φ of the interlinked armature flux Φ by adding the rotor phase θ and the phase Δθ of the interlinked armature flux Φ with respect to the d-axis. Although it is known that the values of the d- and q-axis inductances vary with the d- and q-axis currents due to magnetic saturation, it is possible to reduce magnetic flux estimation errors due to inductance variations by previously storing a relationship between the d- and q-axis currents and inductances in the form of an equation or a table and varying the values of the d- and q-axis inductances used in equations (3) in accordance with the d- and q-axis currents.

FIG. 7 shows another example of the flux calculator 5 varied from that of FIG. 6. A coordinate converter 20 of FIG. 7 works in the same way as that of FIG. 6, whereas a coordinate converter 23 converts three-phase voltages vu, vv, vw of the armature into d- and q-coordinate voltages vd, vq on the rotor axes by using the rotor phase θ. A differentiator 25 obtains electrical angle speed ω of the rotor by differentiating the rotor phase θ.

A voltage-type flux calculator 24 calculates the magnitude |Φ| of the interlinked armature flux Φ and phase Δθ of the interlinked armature flux Φ with respect to the d-axis from the d- and q-coordinate voltages vd, vq and the d- and q-axis currents id, iq. In a permanent magnet motor, there is a relationship expressed by equations (5) among currents, voltages and magnetic fluxes.

$$\begin{cases} \phi_d = \frac{1}{\omega}(v_q - (R + L_q s)i_q) \\ \phi_q = -\frac{1}{\omega}(v_d - (R + L_d s)i_d) \end{cases} \quad (5)$$

where R is the resistance of the armature and s is a differential operator. Terms of equations (5) containing the differential operator s may be disregarded if changes in currents are moderate. In this case, equations (5) can be rewritten as shown in equations (6) below.

$$\begin{cases} \phi_d = \frac{1}{\omega}(v_q - R \cdot i_q) \\ \phi_q = -\frac{1}{\omega}(v_d - R \cdot i_d) \end{cases} \quad (6)$$

Furthermore, if the armature resistance R is relatively small as compared to other terms, terms containing the armature resistance R may be disregarded.

On the other hand, the armature resistance R varies with temperature of the synchronous machine 1. Thus, it is possible to improve the accuracy of magnetic flux estimation if the value of the armature resistance R is corrected by detecting the temperature of the synchronous machine 1. It is possible to calculate the magnitude |Φ| of the interlinked armature flux and the phase ∠Φ of the interlinked armature flux from the d- and q-axis fluxes φd, φq obtained from equations (5) or (6) in the same fashion as in FIG. 6.

While the flux calculator 5 uses feedback values of armature currents and command values of armature voltages input into the flux calculator 5 for calculation in FIG. 1, it is possible to use command values of the armature currents and feedback values of the armature voltages, conversely. Still alternatively, the command values or feedback values may be used for both the armature currents and the armature voltages.

The aforementioned calculation for determining the magnitude and the phase of the magnetic flux from the voltages may be performed without using the rotor phase θ. Specifically, a modification may be made such that the magnitude |Φ| of the interlinked armature flux is obtained by converting values obtained by subtracting resistive voltage drops due to the three-phase currents iu, iv, iw from the three-phase voltages vu, vv, vw into polar coordinates and dividing the magnitude of a polar vector thus obtained by the electrical angle speed e of the armature, and the phase ∠Φ of the interlinked armature flux is obtained by subtracting 90° (when ω>0) from or adding 90° (when ω<0) to the phase of the polar vector. This method is advantageous in that the calculation is simplified.

Although it is possible to estimate the magnetic flux regardless of the turning speed with the flux calculator including the current-type flux calculator shown in FIG. 6, this configuration is susceptible to the influence of variations in motor characteristics due to saturation, for instance, because the inductance values are used in magnetic flux calculation as shown in equations (3). On the other hand, the configuration with the flux calculator including the voltage-type flux calculator shown in FIG. 7 which calculates the magnetic flux by equations (6) is less susceptible to the influence of variations in the motor characteristics because the inductance values are not used. However, the accuracy of estimation may deteriorate when the turning speed is low and the armature voltages are low in this configuration. One method for resolving the aforementioned problems would be such that both the current-type flux calculator and the voltage-type flux calculator are used, and the flux calculator is switched to mainly use the current-type in a range in which the turning speed is low and to mainly use the voltage-type when the turning speed increases, or outputs of the two flux calculators are averaged with the outputs weighted with reference to the turning speed.

Second Embodiment

FIG. 8 is a configuration diagram showing a synchronous machine control apparatus according to a second embodiment of the present invention. This embodiment shows a configuration in which a direct current (DC) source voltage of the three-phase drive circuit 2 is made variable. The numerals 1-9 and 11-13 designate elements which are the same as those of the first embodiment.

Advantages produced by making the DC source voltage of the three-phase drive circuit 2 variable are explained below.

Generally, a DC source voltage of an inverter which works as a power conversion unit is determined by a power supply (a battery or an alternating current power supply) that is used. On the other hand, a permanent magnet motor produces an induced voltage which is generally proportional to turning speed. Thus, in order to increase the turning speed while limiting motor voltages to a level equal to or lower than an upper limit of the inverter, it is necessary to run the motor by field-weakening operation by flowing a field-weakening current for canceling out permanent magnet flux through an armature.

Since this field-weakening current is a reactive current which does not contribute to torque generation, efficiency of the permanent magnet motor considerably deteriorates in a range in which the field-weakening operation is necessary. Additionally, since a maximum current of the inverter is limited, a current usable for torque generation decreases by as much as the amount of the field-weakening current, resulting in a reduction in torque.

In contrast, if the DC source voltage can be increased by making the DC source voltage variable by means of a DC-DC converter, for instance, an upper limit of the turning speed at which the aforementioned field-weakening operation needs to be performed can be increased, making it possible to run the motor at high efficiency and high torque up to a higher turning speed.

On the other hand, the DC-DC converter itself causes a loss, and switching loss of the inverter generally becomes larger as the DC source voltage becomes higher. Thus, overall system efficiency improves if the DC source voltage is not increased in an operating range in which the turning speed is low and it is not necessary to run the motor by the field-weakening operation. Therefore, a method of making the DC source voltage variable as necessary offers the aforementioned advantages.

Returning to FIG. 8, a variable-voltage power supply 26 controls the DC source voltage supplied to the three-phase drive circuit 2 according to a DC voltage command vdc* generated by a flux command generator 10a. There are limitations in an output voltage range of the variable-voltage voltage power supply 26, and there are cases where a DC voltage feedback value vdc⁻ which is a DC voltage actually output by the variable-voltage power supply 26 does not coincide with the DC voltage command vdc* depending on electric power output from the three-phase drive circuit 2, for instance. The flux command generator 10a determines a flux command Φ* referring to the DC voltage feedback value vdc⁻ and the turning speed ω.

FIG. 9 shows an internal configuration of the flux command generator 10a. An optimum flux command calculator 17 outputs an optimum flux command Φ** determined from a δ-axis current command iδ* without any consideration of voltage limitations in the same fashion as in FIG. 3. A multiplier 27 calculates a voltage necessary for generating the optimum flux command Φ by multiplying the optimum flux command Φ by the turning speed (feedback value) ω. An adder 30 calculates the DC voltage command vdc* by adding a voltage margin Δvdc covering a control margin and a resistive voltage drop to the voltage calculated by the multiplier 27 and outputs the DC voltage command vdc*.

On the other hand, an adder 31 calculates a voltage corresponding to magnetic flux by subtracting the voltage margin Δvdc covering the control margin and the resistive voltage drop from the actual DC voltage feedback value vdc⁻ fed back from the variable-voltage power supply 26, and a divider 28 calculates a maximum flux command value Φ*max which can be generated by dividing the voltage corresponding to the magnetic flux by the turning speed ω. A limiter 29 calculates a final flux command Φ* by limiting the optimum flux command Φ** to the maximum flux command value Φ*max.

Thus, under conditions where the variable-voltage power supply 26 realizes control operation in which the DC voltage feedback value vdc⁻ is caused to follow the DC voltage command vdc* in a reliable fashion, the DC voltage feedback value vdc⁻ matched to the DC voltage command vdc* for compensating for the optimum flux command Φ for maximizing the torque obtained by the optimum flux command calculator 17 is supplied. Accordingly, the limiter 29 does not substantially perform flux limiting operation and the optimum flux command Φ is directly output as the flux command Φ* in this case.

Although the flux command generator 10a determines the flux command referring to the DC voltage feedback value vdc⁻ while outputting the DC voltage command vdc* in the configuration of FIG. 8, it is apparent that the flux command generator 10a may determine the flux command referring to the DC voltage feedback value vdc⁻ without outputting the DC voltage command vdc* for the purpose of just coping with variations in the DC source voltage, yet achieving a desired effect.

Also, when the DC source voltage is considered to exactly follow the DC voltage command vdc*, it is apparent that there is no need to refer to the DC voltage feedback value vdc⁻ and the flux command generator 10a may use the DC voltage command vdc* instead of the DC voltage feedback value vdc⁻. Since there are limitations in an output voltage range of the DC source voltage in this case, it is necessary to impose limitations on the DC voltage command vdc* within the flux command generator 10a.

Although the flux command generator 10a does not refer to the armature current in calculating the voltage margin Δvdc in the configuration of FIG. 9, it goes without saying that it is possible to calculate the voltage margin Δvdc referring to the armature current so that power supply utilization factor would further improve.

Third Embodiment

FIG. 10 shows a third embodiment of the present invention.

In the torque current command generator 9 of the aforementioned first embodiment, the torque command τ* given from a preceding stage has a value which can be used as it is.

If the inductance of the synchronous machine 1 is large, however, there may arise a case where it is necessary to limit the torque command τ* for matching the interlinked armature flux Φ with the flux command Φ*. FIG. 10 is a diagram showing an internal configuration of a torque current command generator 9 employed when such torque limitations are necessary. Referring to this Figure, a torque limit generator 32 outputs a maximum torque τ*max which can be generated with magnetic flux specified by the flux command Φ* with reference to the flux command Φ*, and a limiter 33 outputs a limited torque command τ* by limiting the original torque command τ* to the maximum torque τ*max. A torque current limit generator 14, a torque current calculator 15 and a limiter 16 together calculate a δ-axis current command iδ* using the limited torque command τ* by performing operation similar to what was discussed with reference to FIG. 2.

Here, an example of calculation performed by the torque limit generator 32 is explained. If the synchronous machine is a non-salient pole type permanent magnet motor, torque generated by the motor can be expressed by the following equation.

$$\tau = pp \cdot \phi_m \cdot i_q \tag{7}$$

On the other hand, the magnitude of interlinked armature flux φ of the motor can be expressed by the following equation, where L is inductance of the motor which has the same value on both the d- and q-axes in the case of the non-salient pole type.

$$\phi = \sqrt{(\phi_m + L \cdot i_d)^2 + L^2 i_q^2} \tag{8}$$

While a first term under the radical sign of equation (8) can be zeroed by making the value of a d-axis current id negative, a second term is determined by the magnitude of a q-axis current iq. This means that the q-axis current iq must have value which satisfies the following equation when the interlinked armature flux φ is to be adjusted to a desired value φ*.

$$i_q \le \frac{\phi^*}{L} \tag{9}$$

Substituting equation (7) into equation (9), we obtain the following equation.

$$\tau \le pp \frac{\phi_m}{L} \phi^* \tag{10}$$

It is understood from the foregoing discussion that the torque limit generator 32 can calculate the maximum torque τ*max by using equation (10) in the case of the non-salient pole type permanent magnet motor. Needless to say, a relationship between the flux command φ* and the maximum torque τ*max may be stored in the form of a table, and not in the form of the aforementioned equation, if the motor has a saturation characteristic in which the inductance varies with load or when the influence of saliency of the motor should be taken into account.

Fourth Embodiment

FIG. 11 shows a fourth embodiment of the present invention.

The flux command generator 10 of the aforementioned first embodiment was described with reference to a case in which the optimum flux command calculator 17 of the flux command generator 10 calculates the flux command based on the relationship between the torque current and the interlinked armature flux, wherein the torque current is determined under conditions where the torque is maximized with the magnitude of the armature current set to a fixed value.

If the operational characteristics of the synchronous machine 1 are not known in advance or if characteristics obtained by mathematical analysis differ from actual machine characteristics, however, it may become necessary to generate a relationship between the δ-axis current command iδ* and the optimum flux command Φ** that maximizes desired performance of the synchronous machine 1 through a learning process or adjust the relationship thus generated.

FIG. 11 is a diagram showing an internal configuration of an optimum flux command calculator 17 employed when it is necessary to generate the δ-axis current command iδ* and the optimum flux command Φ** through a learning process.

An initial flux command calculator 34 stores a relationship between the δ-axis current command iδ* and the magnitude |Φ_init| of an initial optimum flux command in the form of an equation or a data table and outputs the initial optimum flux command Φ_init in response to the input δ-axis current command iδ*. The initial optimum flux command Φ**_init may take a value falling within an output range of the flux command which can be output in response to the δ-axis current command iδ*. This makes it possible to give a rough initial value from typical motor characteristics even when the optimum flux command Φ** is not known in advance.

When a flux adjustment command S_adj requiring an adjustment of the input initial optimum flux command Φ**_init is entered from a preceding stage, a flux command adjuster 35 adjusts the flux command Φ*adj such that the desired performance is maximized and outputs an adjusted flux command Φ*adj as the command Φ** of the optimum flux command calculator 17. The adjusted flux command Φ*adj is also used as update data for updating the flux command value Φ**_init corresponding to the input δ-axis current command iδ* to update the equation or the data table stored in the initial flux command generator 34.

When the flux adjustment command S_adj is not entered from the preceding stage, the flux command adjuster 35 does not work and the output Φ_init of the initial flux command generator 34 directly becomes the optimum flux command Φ.

FIG. 12 is a flowchart showing operation of the flux command adjuster 35 performed under conditions where the desired performance is to maximize the torque.

First, a judgment is made to determine whether the flux adjustment command S_adj is entered from a preceding command stage (step S1). It is to be noted that the flux adjustment command S_adj becomes ON only when the synchronous machine 1 is operated at a constant torque and at a constant output under conditions where no limitations are imposed on output voltages of the three-phase drive circuit 2. If the flux adjustment command S_adj is ON, the flux command adjuster 35 adjusts the flux command Φ*adj, and if the flux adjustment command S_adj is OFF, the flux command adjuster 35 skips to step S10 and outputs the initial optimum flux command Φ**_init.

Next, the flux command adjuster 35 initializes and fixedly sets the flux command Φ*adj to be adjusted to a minimum value Φ**_min of the flux command value which can be output (step S2). Since the synchronous machine 1 is operated with the torque command τ* set to a fixed value at this time, the torque current command iδ* has a value obtained by dividing the torque command τ* by the flux command Φ**_min as can be seen from equation (1). After the flux command Φ*adj has been updated, the flux command adjuster 35 waits until the torque current iδ and the magnitude |Φ| of the magnetic flux converge to respective command values iδ*_adj, Φ*₁₃ adj (step S3).

After the torque current iδ and the magnitude |Φ| of the magnetic flux have converged to the command values, the flux command adjuster 35 calculates the magnitude ia of the armature current from the armature currents iu, iv, iw (step S4). Further, the flux command adjuster 35 compares the magnitude ia with a minimum value ia_min of the armature current (step S5). If the magnitude ia is smaller than the minimum value ia_min of the armature current, the present torque current command iδ*_adj and flux command Φ*_adj are stored as a pair (iδ*_opt, Φ*_opt) of torque current command iδ* and flux command Φ* which satisfies the maximum torque conditions. Also, the minimum value ia_min of the armature current is updated by the magnitude ia of the armature current (step S6).

Subsequently, the flux command adjuster 35 updates and fixedly sets the flux command Φ*adj by incrementing the flux command Φ*adj fixedly set in step S2 by ΔΦ (step S7). Then, if this flux command does not exceed a flux command Φ**_max which can be output, the flux command adjuster 35 re-executes steps S3 to S7 (step S8).

As the aforementioned operation is repeated, values (iδ*_adj, Φ*_adj) which minimize the armature current ia when the flux command Φ*_adj is varied from the minimum value Φ_min to the maximum value Φ_max, that is, a pair of torque current command and flux command which satisfies the maximum torque conditions is stored as (iδ*_opt, Φ*_opt).

Finally, the equation or the data table stored in the initial flux command generator 34 is updated by using (iδ*_opt, Φ*_opt) mentioned above (step S9). After the equation or the data table stored in the initial flux command generator 34 has been updated, the flux command Φ*adj fixedly set by the flux command adjuster 35 is made alterable and the flux command adjuster 35 outputs the updated flux command Φ_init of the (initial) flux command generator 34 as the optimum flux command Φ in response to the torque current command iδ* (step S10).

While the flux command which minimizes the armature current ia is obtained by varying the flux command Φ*adj of the flux command adjuster 35 from the minimum value to the maximum value at a resolution of ΔΦ in the flowchart of FIG. 12, it is possible to reduce processing time if a point where the armature current is minimized is determined by a converging approach.

FIG. 13 is a flowchart showing operation of the flux command adjuster 35 performed when determining (iδ*_opt, Φ*_opt) mentioned above by a converging approach.

Referring to FIG. 13, a judgment is made to determine whether the flux adjustment command from the preceding command stage as in FIG. 12 at first (step S1). If the flux adjustment command is ON, the flux command adjuster 35 adjusts the flux command, and if the flux adjustment command is OFF, the flux command adjuster 35 skips to step S9 and directly outputs the initial optimum flux command $\Phi^{**}\_init$.

Next, the flux command adjuster 35 fixedly sets the flux command $\Phi^*adj$ to the present flux command $\Phi^{**}\_init$ (step S2). Then, the flux command adjuster 35 waits until the flux $|\Phi|$ and the torque current $i\delta$ converge to the command values (step S3).

Next, after measuring the magnitude ia of the armature current (step S4), the flux command adjuster 35 calculates a flux command increment $\Delta\Phi$ which is a difference between a next flux command and the present flux command (step 5S). Here, the increment of the flux command is determined by taking three points surrounding a minimum value of the magnitude ia of the armature current as initial three points of the flux command and selecting an increment which maximizes a reduction in differences among flux commands corresponding to the three points surrounding the minimum value of the magnitude ia of the armature current in a succeeding update cycle. A method usable for this kind of increment selection is parabolic interpolation and Brent's method (one-dimensional), for example.

Subsequently, the increment thus determined is compared with a minimum increment of the flux command, that is, a convergence error $d\Phi$ of the flux command (step S6). If the increment $\Delta\Phi$ is larger than the convergence error $d\Phi$, the flux command adjuster 35 updates and fixedly sets the flux command $\Phi^*adj$ by adding the increment $\Delta\Phi$ thereto (step S7). The flux command adjuster 35 repeatedly performs a loop of steps S3 to S6 until $\Delta\Phi$ converges to a value smaller than the convergence error $d\Phi$.

Upon completion of convergence, the pair ($i\delta^*\_adj$, $\Phi^*\_adj$) of torque current command and flux command becomes equal to the pair ($i\delta^*\_opt$, $\Phi^*\_opt$) of torque current command and flux command which satisfies the maximum torque conditions. The equation or the data table stored in the initial flux command generator 34 is updated by this pair (step S8). Then, the flux command adjuster 35 outputs the updated flux command $\Phi^{**}\_init$ in response the torque current command $i\delta^*$ (step S9).

It is understood from the foregoing discussion that the optimum flux command $\Phi^{**}$ corresponding to the torque current command $i\delta^*$ can be obtained through a learning process with the addition of a flux command adjuster which operates as shown in the flowchart of FIG. 12 or 13 even when a relationship between the torque current command $i\delta^*$ and the flux command $\Phi^*$ which satisfy the maximum torque conditions is not known in advance.

If the desired performance is minimum input power, the flowcharts of FIGS. 12 and 13 may be so modified as to minimize the product of a DC linkage voltage Vdc and a DC current Idc of the three-phase drive circuit 2, or DC power Pdc, instead of the armature current ia. This modification would make it possible to obtain points of the torque current command $i\delta^*$ and the optimum flux command $\Phi^{**}$ at which the input power is minimized for the same magnitude ia of the armature current.

It goes without saying that the flowcharts may be so modified as to minimize the DC current Idc if the DC linkage voltage Vdc is stable.

As thus far discussed, the torque current command generator includes in an upstream stage therewithin a torque limit generator for generating a maximum torque command value which can be generated based on the flux command, and a limiter for imposing limitations on the torque command based on the maximum torque command value, wherein the torque current command generator calculates the torque current command based on the torque command limited by this limiter in the present invention. It is therefore possible to smoothly control the synchronous machine even when it is necessary to limit the torque command.

Also, the flux command generator includes a flux limit generator into which a turning speed feedback value from the synchronous machine is input whereby the flux limit generator generates a maximum flux command value which can be generated based on the turning speed feedback value and a voltage limit value of the power conversion unit such that the armature voltage does not exceed the voltage limit, and a limiter for imposing limitations on the flux command based on the maximum flux command value. It is therefore possible to generate a desired flux command not exceeding the voltage limit of the power conversion unit in a reliable fashion.

Also, the synchronous machine control apparatus further includes a variable-voltage power supply for supplying a DC voltage to the power conversion unit based on a DC voltage command, and the flux command generator includes a multiplier into which a turning speed feedback value from the synchronous machine is input whereby the multiplier generates the DC voltage command to be output to the variable-voltage power supply by multiplying the flux command by the turning speed feedback value, a divider for generating a maximum flux command value which can be generated by dividing a DC voltage feedback value input from the variable-voltage power supply by the turning speed feedback value, and a limiter for imposing limitations on the flux command based on the maximum flux command value. It is therefore possible to take advantage of making the DC voltage variable without any problems.

Also, the synchronous machine control apparatus is configured such that the DC voltage command is input into the divider instead of the DC voltage feedback value. This serves to correspondingly simplifies a configuration for control.

Also, the synchronous machine control apparatus further includes a variable-voltage power supply for supplying a DC voltage to the power conversion unit based on a DC voltage command, and the flux command generator includes a divider into which a turning speed feedback value from the synchronous machine is input whereby the divider generates a maximum flux command value which can be generated by dividing a DC voltage feedback value input from the variable-voltage power supply by the turning speed feedback value, and a limiter for imposing limitations on the flux command based on the maximum flux command value. It is therefore possible to take advantage of making the DC voltage variable without any problems.

Also, the synchronous machine control apparatus is configured such that a magnetizing current feedback value which is a magnetizing component of a feedback value of the armature current is input into the torque current command generator instead of the magnetizing current command. This permits stable and prompt execution of control operation.

Also, the synchronous machine control apparatus is configured such that the interlinked armature flux is input into the torque current command generator instead of the flux command. This permits stable and prompt execution of control operation.

Also, the synchronous machine control apparatus is configured such that a torque current feedback value which is a torque component of a feedback value of the armature current is input into the flux command generator instead of the torque current command. This permits stable and prompt execution of control operation.

Also, the flux command generator calculates the flux command based on a relationship between a torque current and the interlinked armature flux, wherein the torque current is determined under conditions where a torque is maximized with the magnitude of the armature current set to a fixed value. It is therefore possible to realize useful synchronous machine control which can maximize the torque under given conditions.

Also, the flux command generator calculates a relationship between a torque current and the interlinked armature flux through a learning process such that the flux command generator outputs the flux command based on the relationship between the torque current and the interlinked armature flux, wherein the torque current is determined under conditions where the magnitude of the armature current or input power is minimized with the torque command set to a fixed value. It is therefore possible to realize useful synchronous machine control which can minimize the magnitude of the armature current or input power under given conditions even when operational characteristics of the synchronous machine are not known in advance or characteristics obtained by mathematical analysis differ from actual machine characteristics.

BRIEF DESCRIPTION OF THE DRAWINGS

FIG. 9 is a diagram showing an internal configuration of a flux command generator 10a;

DESCRIPTION OF THE SYMBOLS

Figure 1:
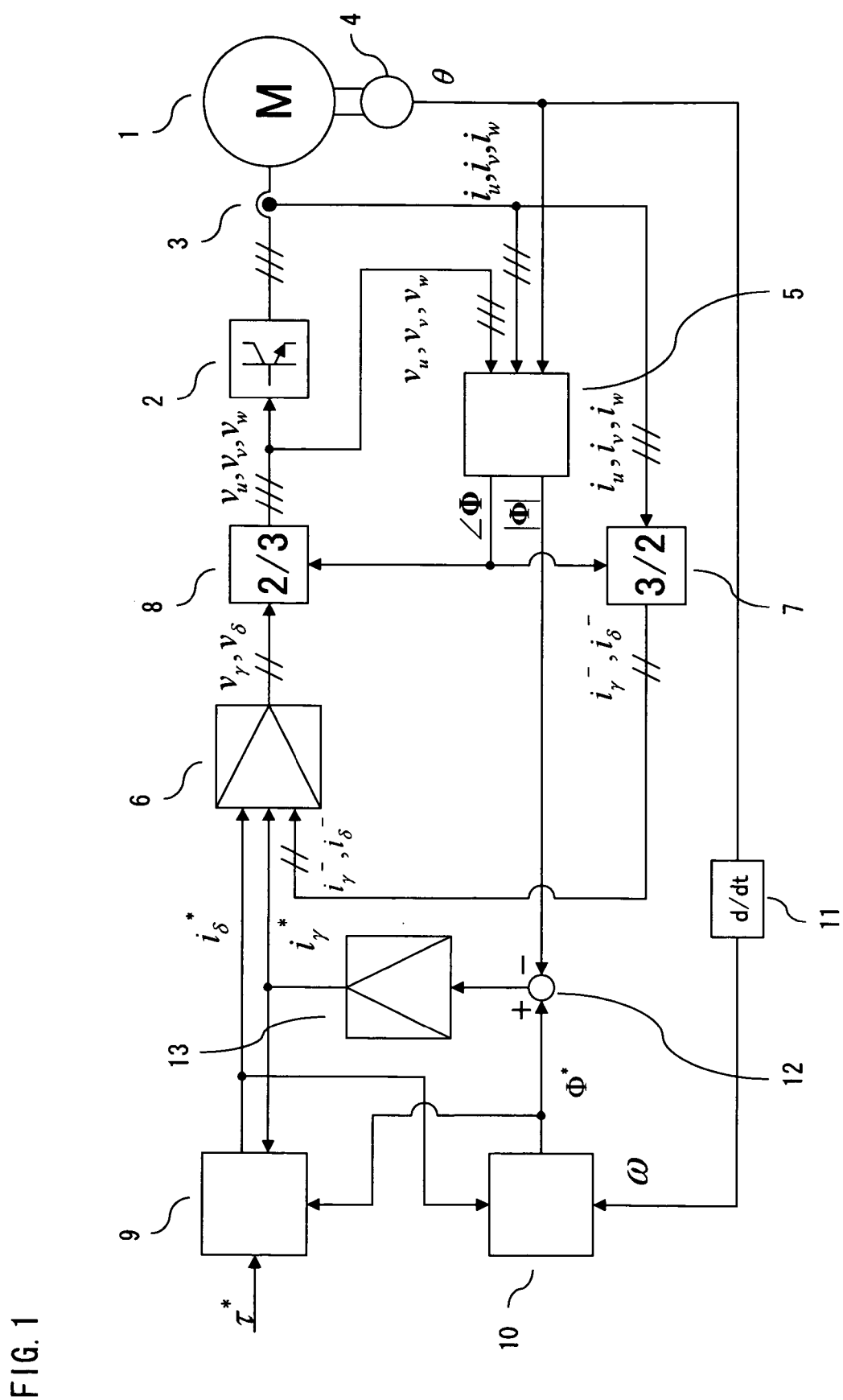
FIG. 1 is a configuration diagram showing a synchronous machine control apparatus according to a first embodiment of the present invention.
Figure 2:
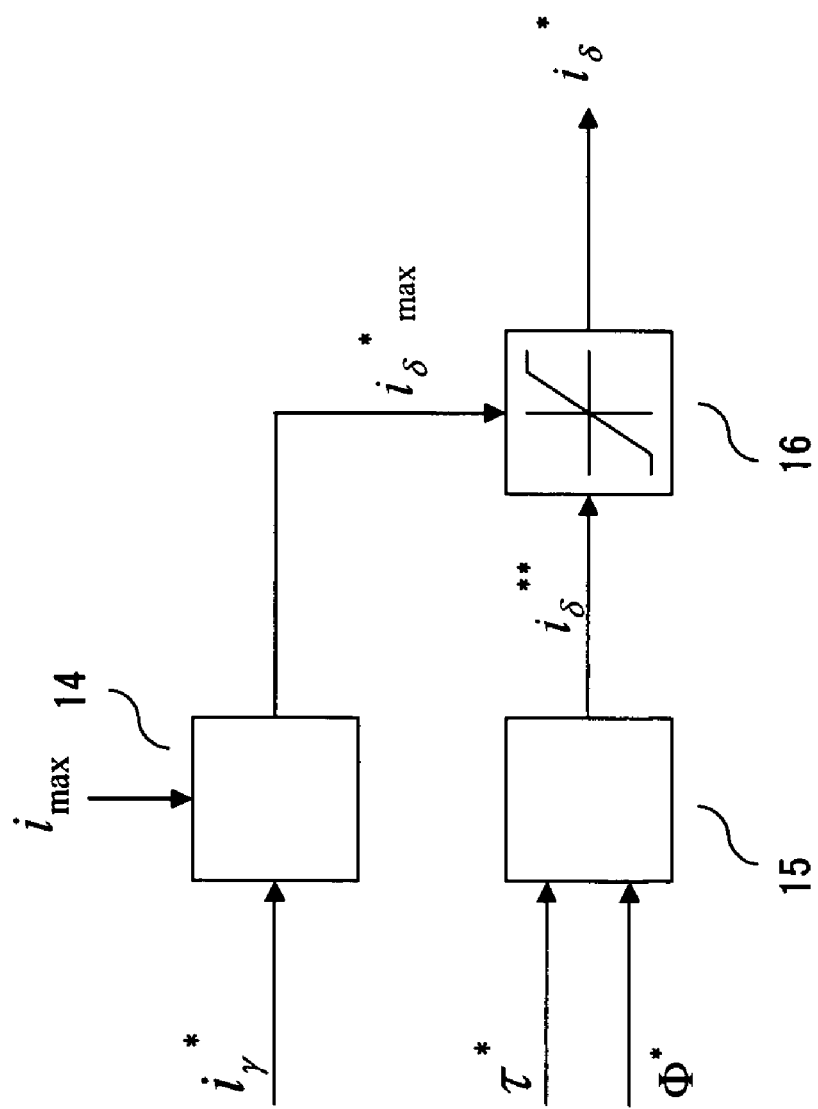
FIG. 2 is a diagram showing an internal configuration of a torque current command generator 9.
Figure 3:
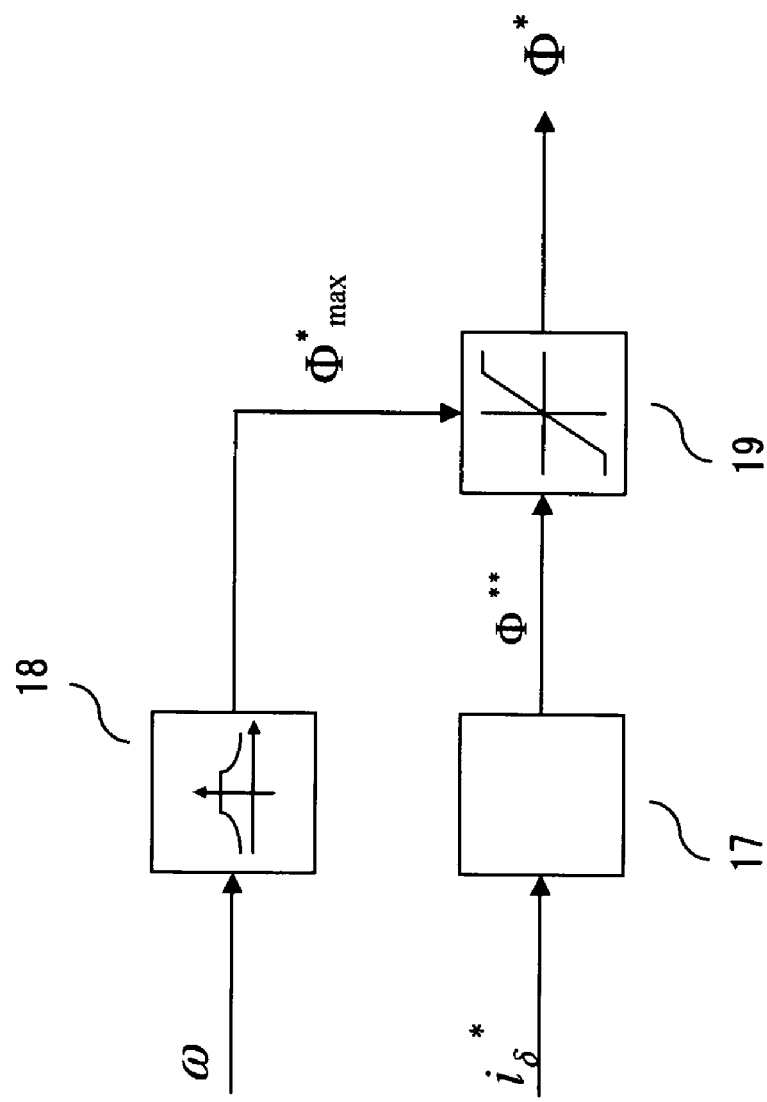
FIG. 3 is a diagram showing an internal configuration of a flux command generator 10.
Figure 4:
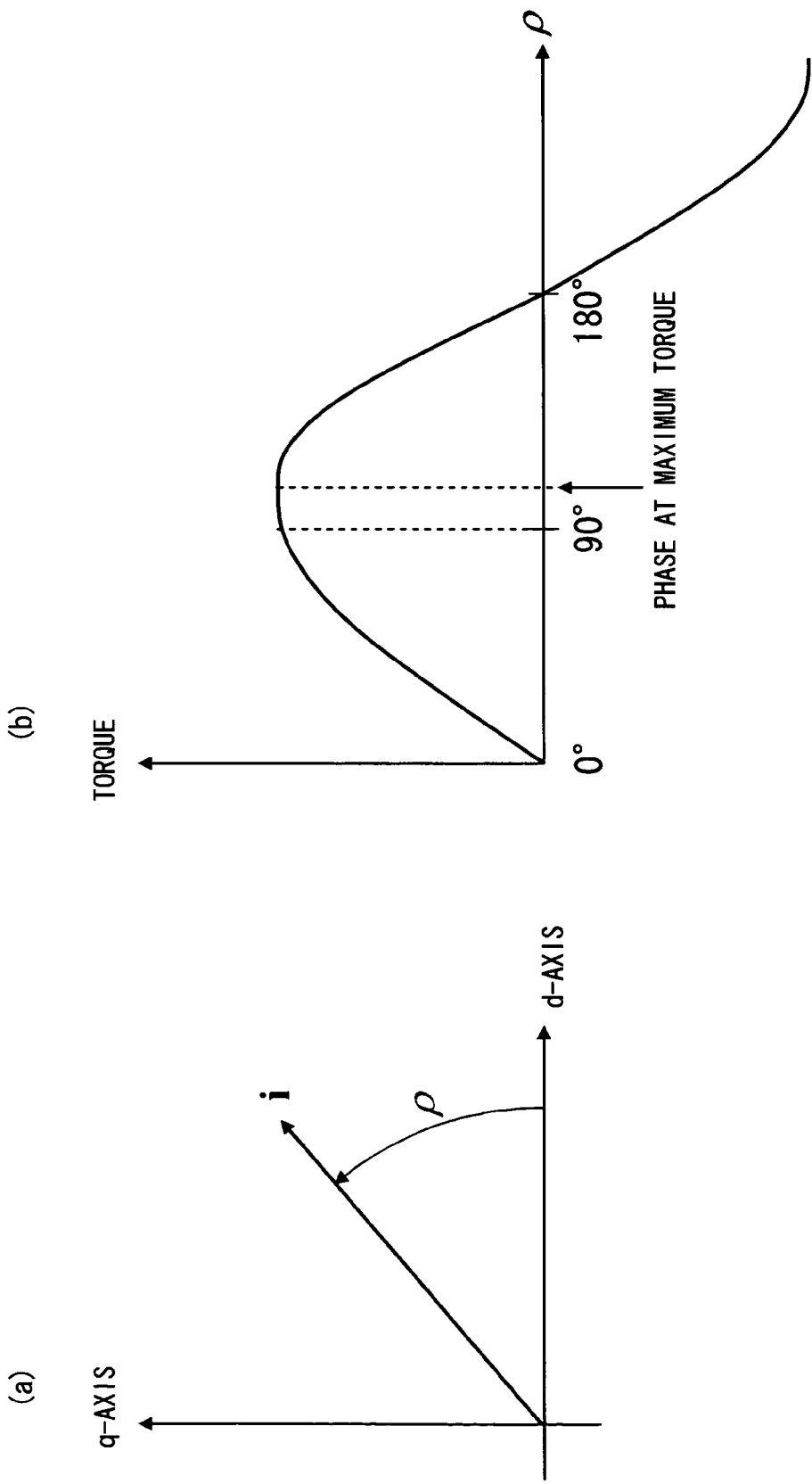
FIG. 4 is a diagram illustrating a relationship between an armature current and torque.
Figure 5:
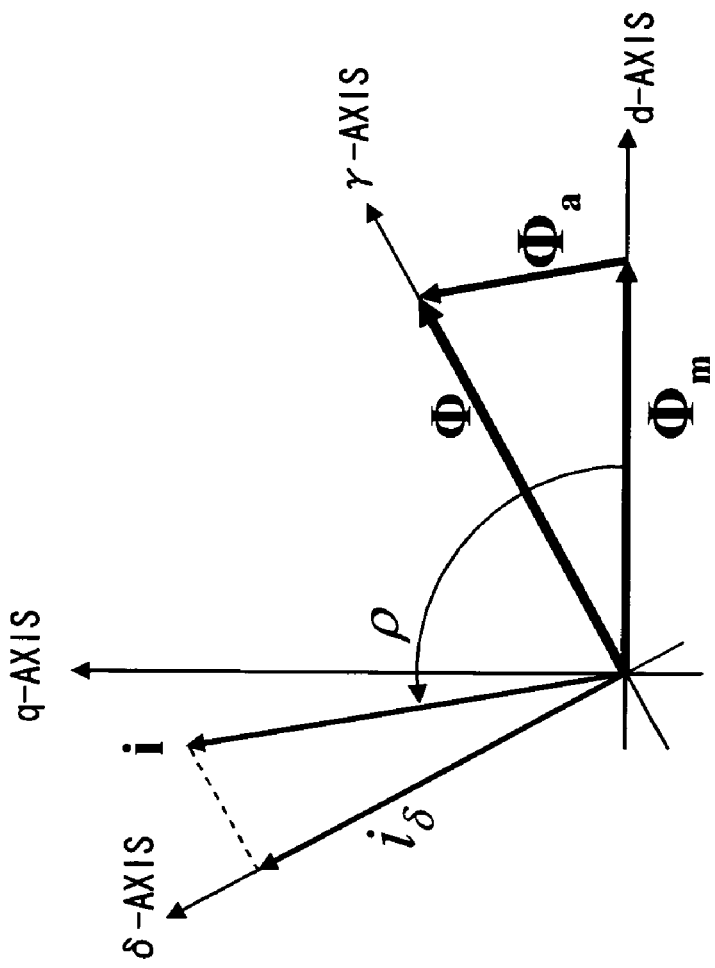
FIG. 5 is a vector diagram of a motor in a maximum torque state.
Figure 6:
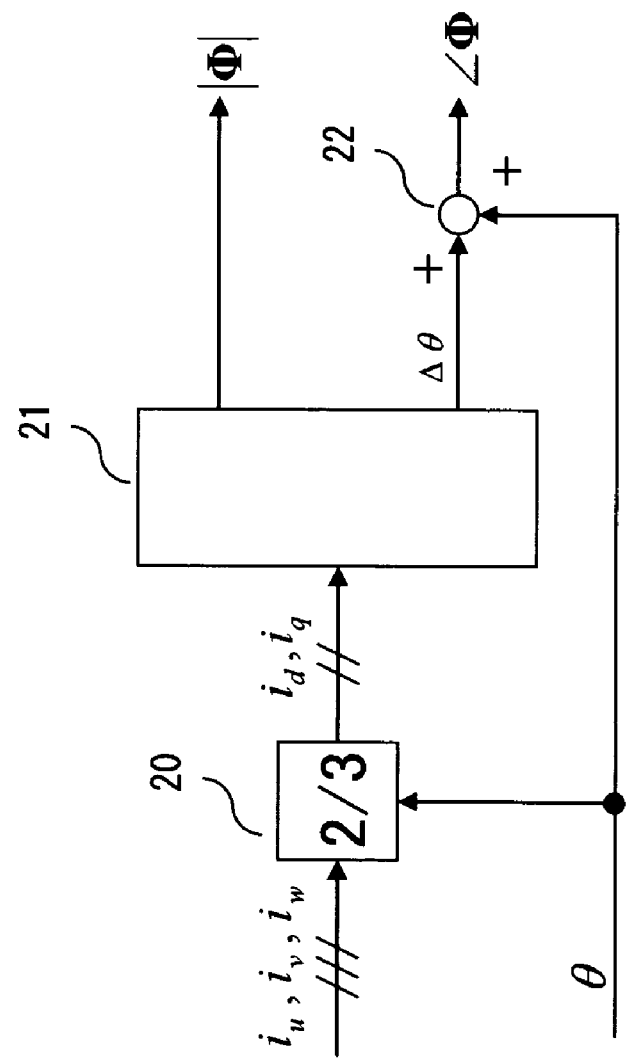
FIG. 6 is a diagram showing an internal configuration of a flux calculator 5.
Figure 7:
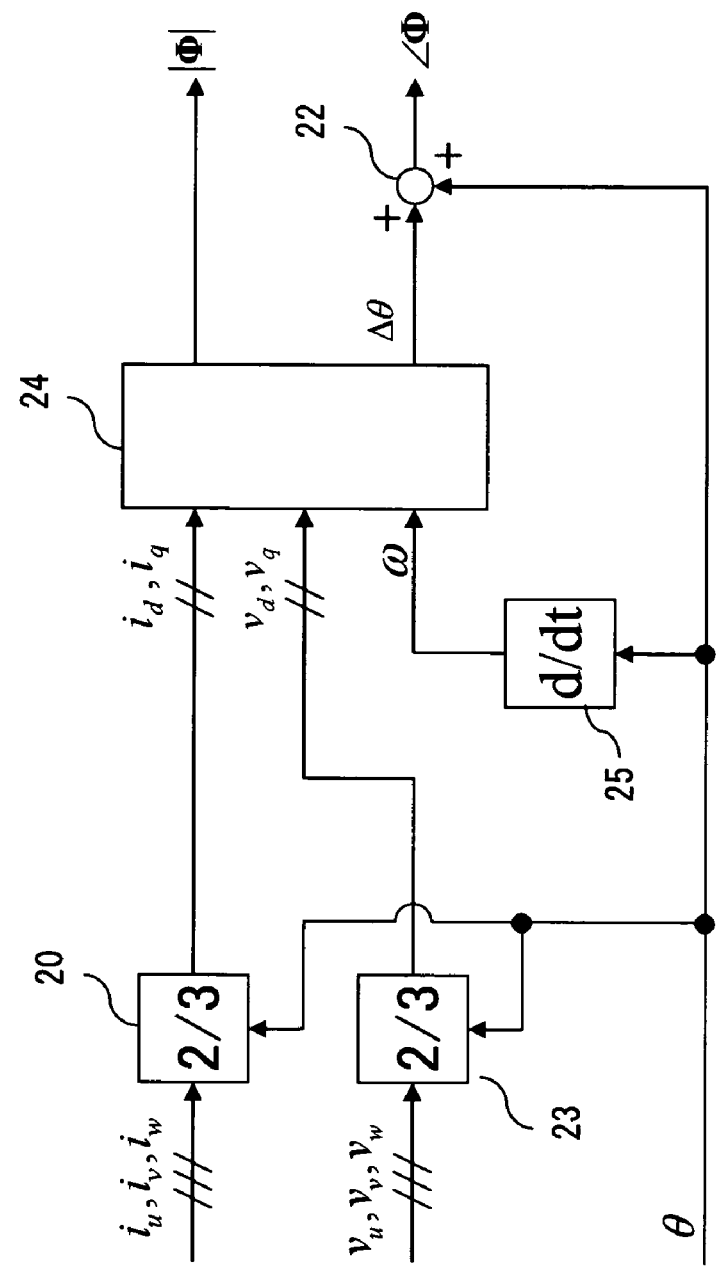
FIG. 7 is a diagram showing an internal configuration of a flux calculator 5 varied from that of FIG. 6.
Figure 8:
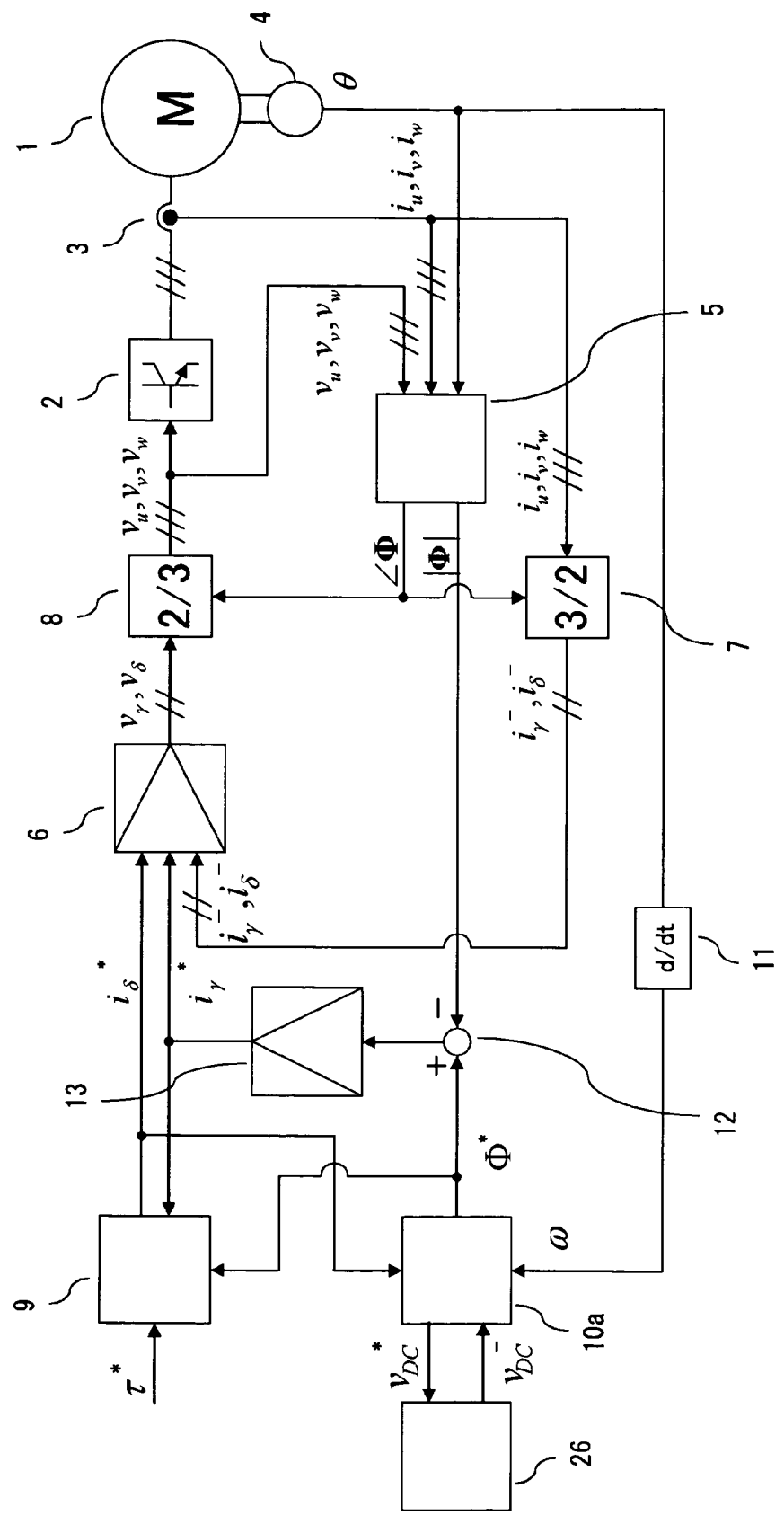
FIG. 8 is a configuration diagram showing a synchronous machine control apparatus according to a second embodiment of the present invention.
Figure 9:
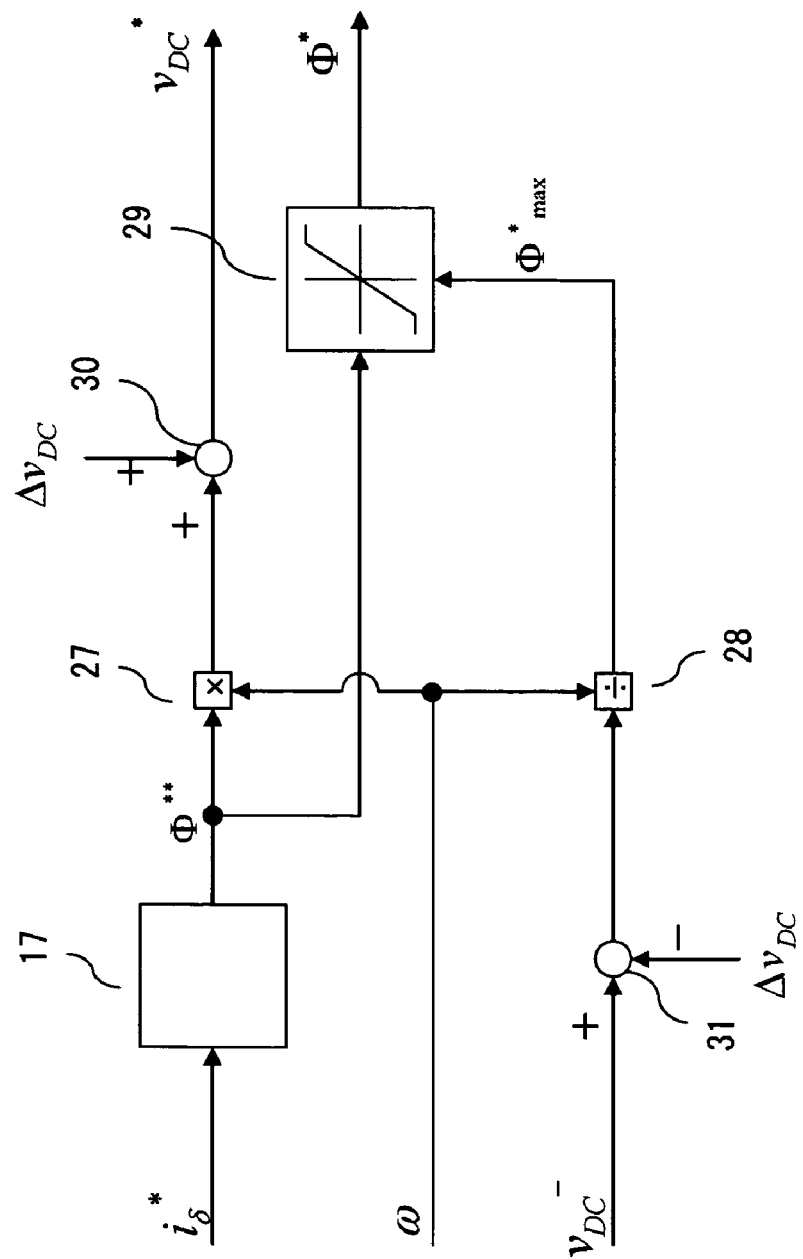
Figure 10:
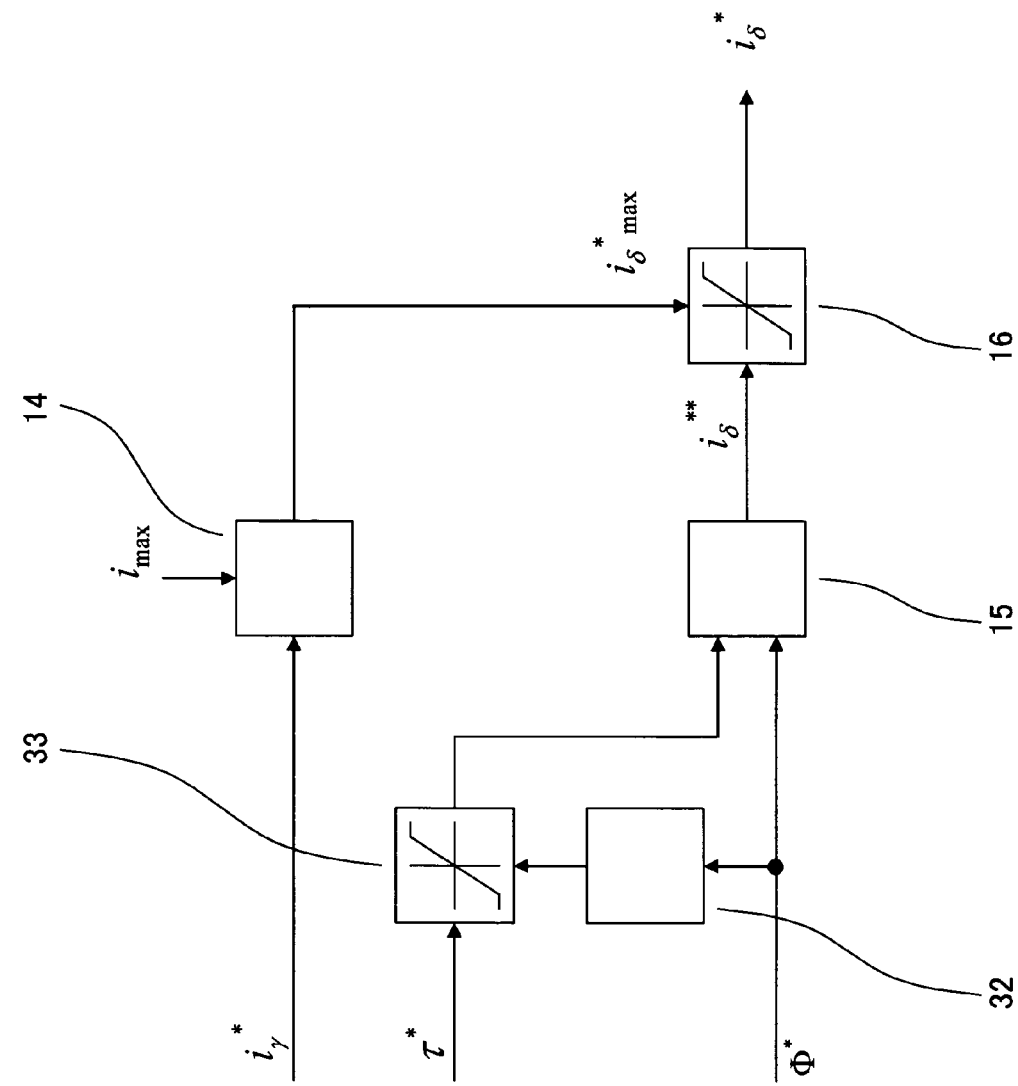
FIG. 10 is a diagram showing, in particular, an internal configuration of a torque current command generator 9 of a synchronous machine control apparatus according to a third embodiment of the present invention.
Figure 11:
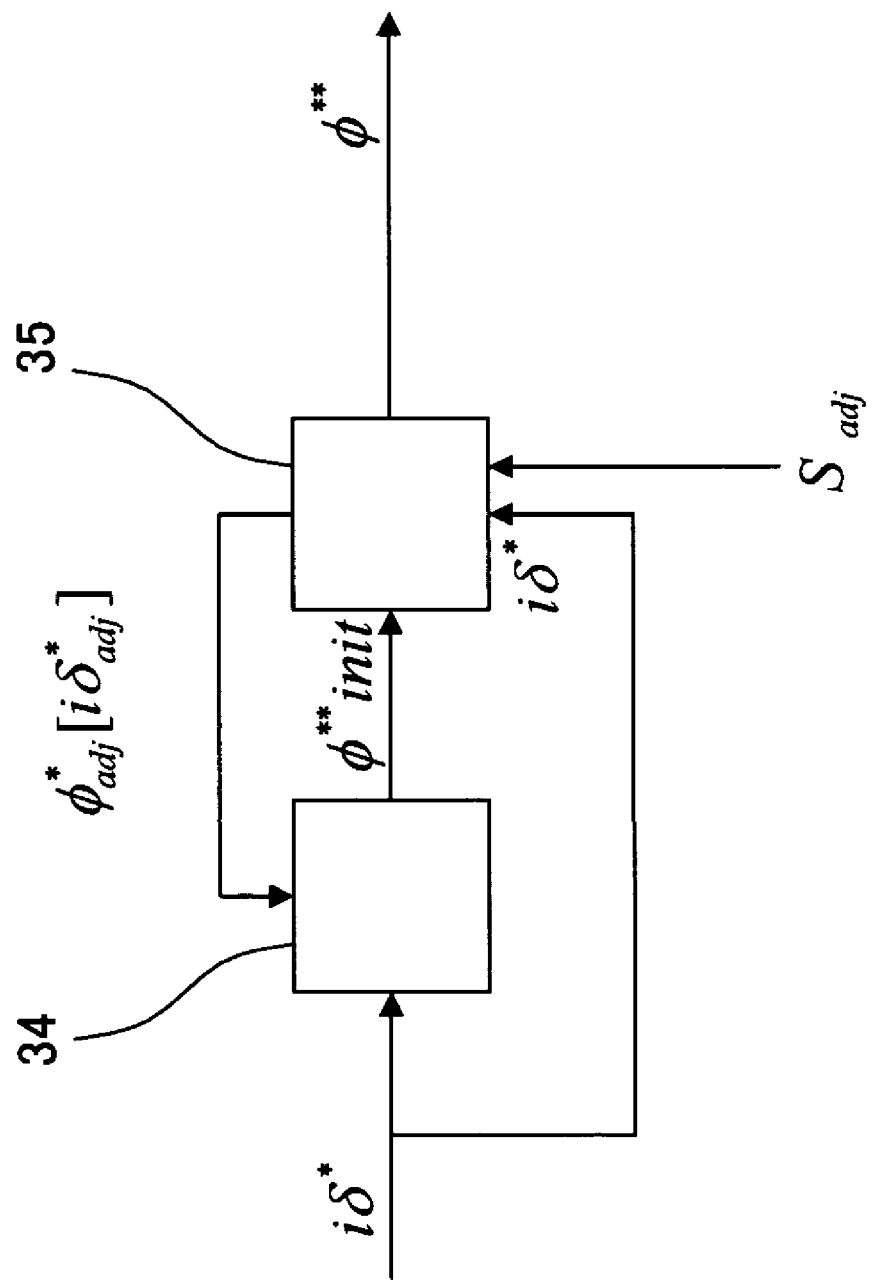
FIG. 11 is a diagram showing, in particular, an internal configuration of an optimum flux command calculator 17 of a synchronous machine control apparatus according to a fourth embodiment of the present invention.
Figure 12:
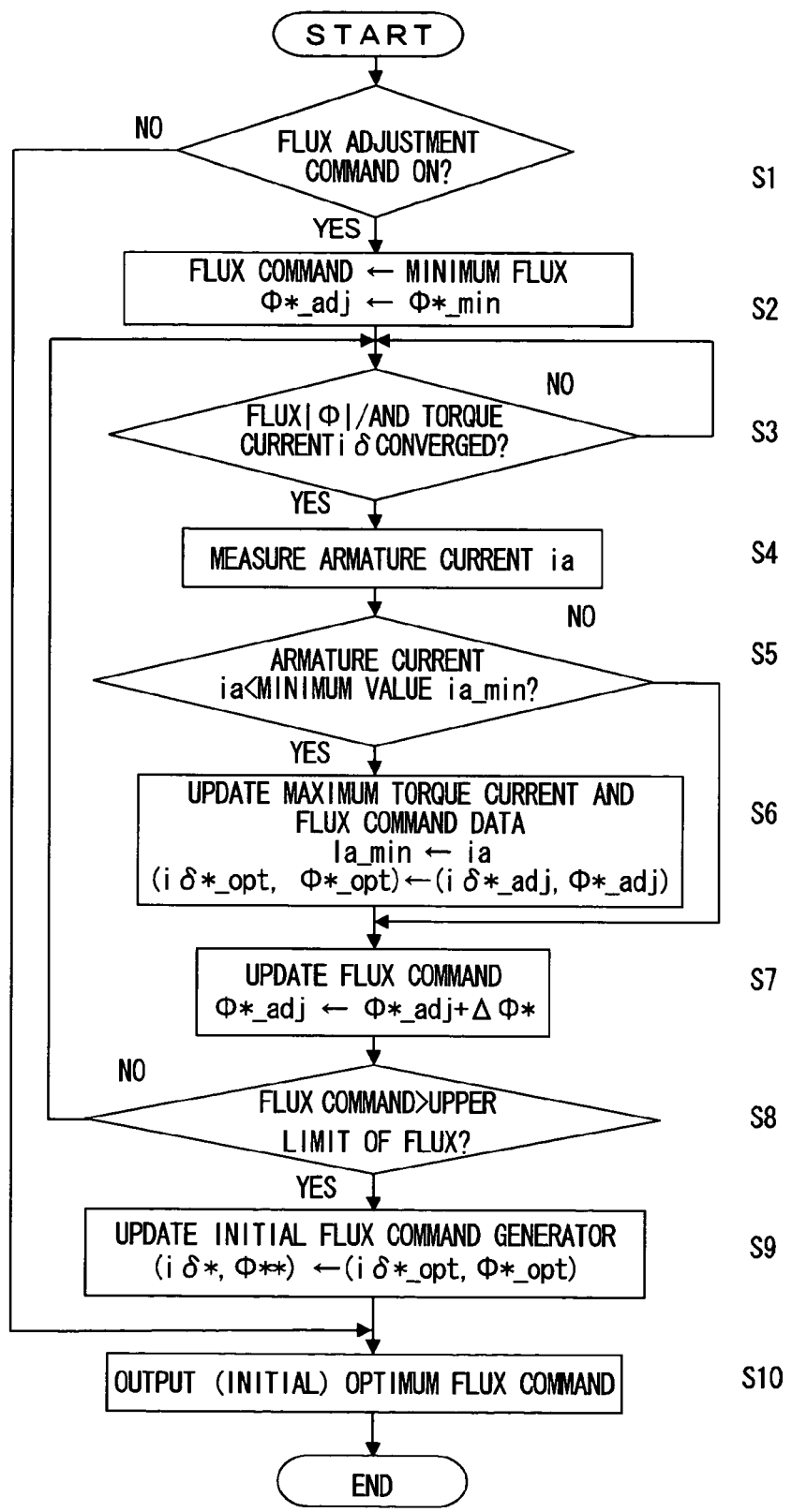
FIG. 12 is a flowchart illustrating operation of the optimum flux command calculator 17 of FIG. 11.
Figure 13:
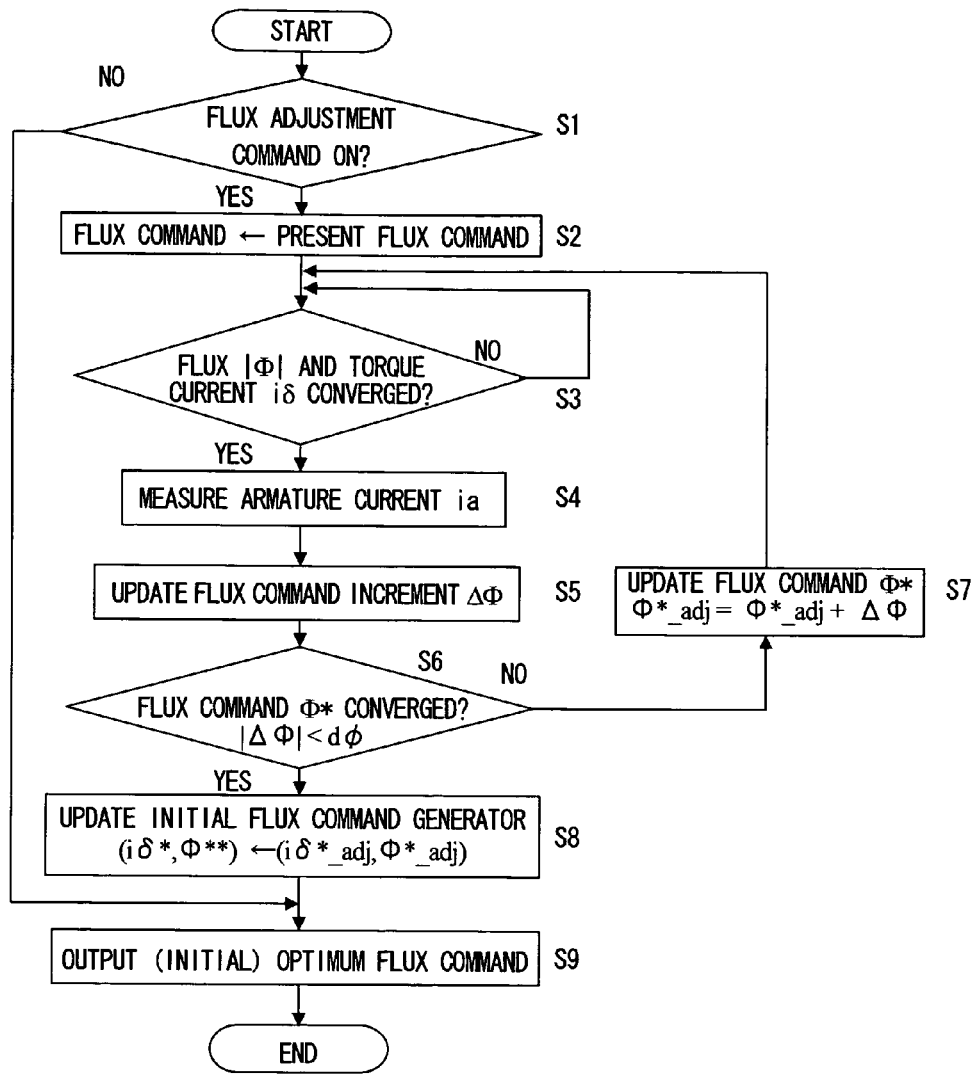
FIG. 13 is a flowchart illustrating operation of the optimum flux command calculator 17 of FIG. 11 performed in a way different from FIG. 12.

| | Description of the Symbols |
|---|---|
| 1 | Synchronous machine |
| 2 | Three-phase drive circuit |
| 3 | Current sensor |
| 4 | Rotor position sensor |
| 5 | Flux calculator |
| 6 | Armature current controller |
| 9 | Torque current command generator |
| 10, 10a | Flux command generator |
| 13 | Flux controller |
| 14 | Torque current limit generator |
| 15 | Torque current calculator |
| 16 | Limiter |
| 17 | Optimum flux command calculator |
| 18 | Flux limit generator |
| 19 | Limiter |
| 21 | Current-type flux calculator |
| 24 | Voltage-type flux calculator |
| 26 | Variable-voltage power supply |
| 27 | Multiplier |
| 28 | Divider |
| 29 | Limiter |
| 32 | Torque limit generator |
| 33 | Limiter |
| 34 | Initial flux command generator |
| 35 | Flux command generator |

The invention claimed is:

1. A synchronous machine control apparatus for generating an armature current command from a torque command and controlling an armature current of a synchronous machine by means of a power conversion unit based on said armature current command, said synchronous machine control apparatus comprising:

a torque current command generator including:
a torque current calculator for calculating a torque current command which is a torque component of said armature current command from said torque command and a flux command;
a torque current limit generator for generating a maximum torque current command value which can be generated based on a magnetizing current command which is a magnetizing component of said armature current command and a current limit value of said power conversion unit such that said armature current does not exceed said current limit value; and
a limiter for imposing limitations on said torque current command based on said maximum torque current command value;

a flux command generator for calculating the flux command based on the torque current command fed from said torque current command generator;

a flux calculator for calculating interlinked armature flux based on the armature current or on a combination of the armature current and an armature voltage of said synchronous machine; and a flux controller for generating said magnetizing current command such that said flux command and said interlinked armature flux coincide with each other and delivering said magnetizing current command to said torque current command generator.

2. The synchronous machine control apparatus as claimed in claim 1, wherein said torque current command generator includes in an upstream stage therewithin:
a torque limit generator for generating a maximum torque command value which can be generated based on said flux command; and
a limiter for imposing limitations on said torque command based on said maximum torque command value;

wherein said torque current command generator calculates the torque current command based on the torque command limited by said limiter.

3. The synchronous machine control apparatus as claimed in claim 1, wherein said flux command generator includes:
- a flux limit generator into which a turning speed feedback value from said synchronous machine is input whereby said flux limit generator generates a maximum flux command value which can be generated based on said turning speed feedback value and a voltage limit value of said power conversion unit such that said armature voltage does not exceed the voltage limit; and
- a limiter for imposing limitations on said flux command based on said maximum flux command value.

4. The synchronous machine control apparatus as claimed in claim 1, further comprising a variable-voltage power supply for supplying a DC voltage to said power conversion unit based on a DC voltage command, said flux command generator including:
- a multiplier into which a turning speed feedback value from said synchronous machine is input whereby said multiplier generates said DC voltage command to be output to said variable-voltage power supply by multiplying said flux command by said turning speed feedback value;
- a divider for generating a maximum flux command value which can be generated by dividing a DC voltage feedback value input from said variable-voltage power supply by said turning speed feedback value; and
- a limiter for imposing limitations on said flux command based on said maximum flux command value.

5. The synchronous machine control apparatus as claimed in claim 4, wherein said DC voltage command is input into said divider instead of said DC voltage feedback value.

6. The synchronous machine control apparatus as claimed in claim 1, further comprising a variable-voltage power supply for supplying a DC voltage to said power conversion unit based on a DC voltage command, said flux command generator including:
- a divider into which a turning speed feedback value from said synchronous machine is input whereby said divider generates a maximum flux command value which can be generated by dividing a DC voltage feedback value input from said variable-voltage power supply by said turning speed feedback value; and
- a limiter for imposing limitations on said flux command based on said maximum flux command value.

7. The synchronous machine control apparatus as claimed in claim 1, wherein a magnetizing current feedback value which is a magnetizing component of a feedback value of said armature current is input into said torque current command generator instead of said magnetizing current command.

8. The synchronous machine control apparatus as claimed in claim 1, wherein said interlinked armature flux is input into said torque current command generator instead of said flux command.

9. The synchronous machine control apparatus as claimed in claim 1, wherein a torque current feedback value which is a torque component of a feedback value of said armature current is input into said flux command generator instead of said torque current command.

10. The synchronous machine control apparatus as claimed in claim 1, wherein said flux command generator calculates said flux command based on a relationship between a torque current and the interlinked armature flux, wherein the torque current is determined under conditions where a torque is maximized with the magnitude of said armature current set to a fixed value.

11. The synchronous machine control apparatus as claimed in claim 1, wherein said flux command generator calculates a relationship between a torque current and the interlinked armature flux through a learning process such that said flux command generator outputs said flux command based on the relationship between the torque current and the interlinked armature flux, wherein the torque current is determined under conditions where the magnitude of said armature current or input power is minimized with said torque command set to a fixed value.

* * * * *